Jan. 16, 1923.
C. T. BROWN.
SHOCK ABSORBER.
FILED AUG. 10, 1921.
1,442,246.
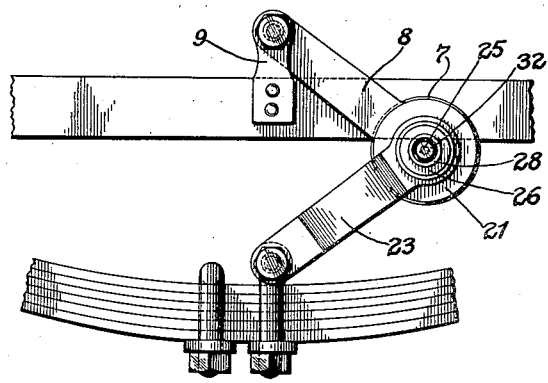
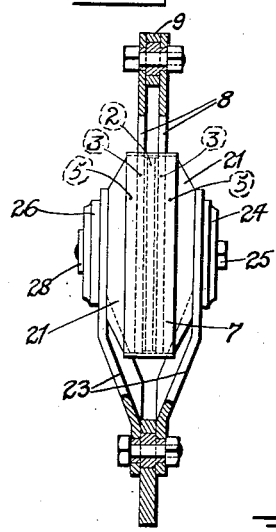
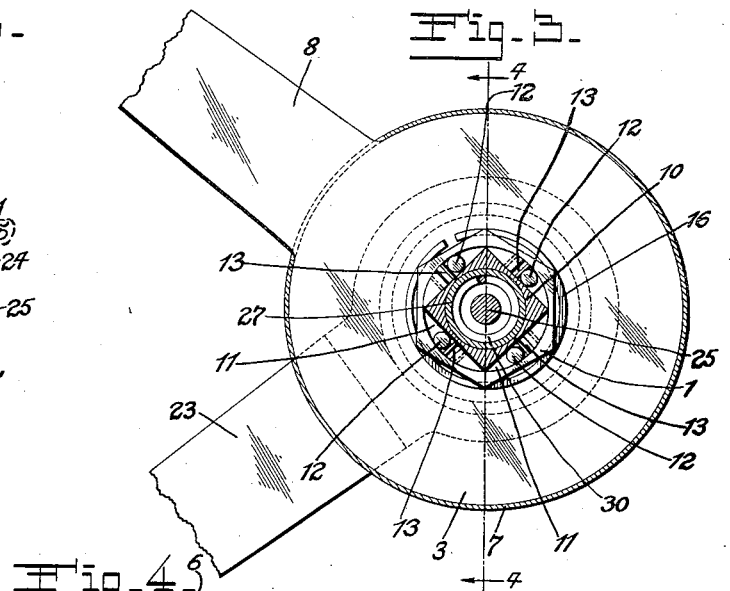
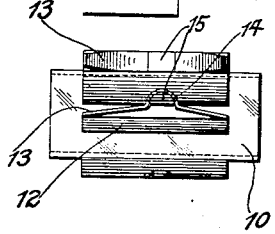
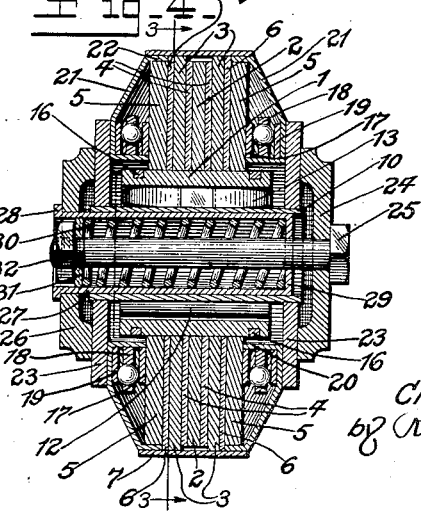
Inventor:
Charles T. Brown,
by Rippey Kingsland
His Attorneys.

Patented Jan. 16, 1923.

1,442,246

UNITED STATES PATENT OFFICE.

CHARLES T. BROWN, OF ST. LOUIS, MISSOURI.

SHOCK ABSORBER.

Application filed August 10, 1921. Serial No. 491,086.

*To all whom it may concern:*

Be it known that I, CHARLES T. BROWN, a citizen of the United States, residing at St. Louis, Missouri, have invented a new and useful Shock Absorber, of which the following is a specification.

This invention relates to shock absorbers.

An object of the invention is to provide an improved shock absorber for cooperation with the body or chassis and the springs of a vehicle for controlling the rebound of the body or chassis and for preventing undesirable vibration and oscillation thereof when the vehicle is travelling over rough or uneven surfaces.

Another object of the invention is to provide an improved shock absorber of the disc type with means for connecting the absorber to the proper part of the vehicle and with novel and improved means for adjusting and controlling the parts of the absorber so as to obtain the desired results, irrespective of any variations in the load of the vehicle.

Another object of the invention is to provide an improved shock absorber of the disc type with a clutch device of novel and improved construction.

Another object of the invention is to provide improved means for varying the adjustment of the parts so that the clutch may be adapted for use under various conditions.

Various other objects and advantages will appear from the following description, reference being made to the drawing showing a preferred embodiment of the invention, in which, Fig. 1 is a side elevation of my improved shock absorber connected to the proper parts of the vehicle.

Fig. 2 is an elevation from another point of view.

Fig. 3 is a sectional view on the line 3—3 of Fig. 4.

Fig. 4 is a sectional view on the line 4—4 of Fig. 3.

Fig. 5 is a view showing the manner in which the actuating springs of the clutch rollers are mounted.

In the preferred embodiment of the invention shown in the drawings, my improved shock absorber comprises a clutch of novel construction and arrangement, in combination with associated parts, all arranged and combined so that when the device is properly connected with the vehicle, the rebound and vibration incident to the travel of the vehicle over rough or uneven surfaces is prevented without interfering with the proper functioning of the vehicle springs. The clutch includes a polygonal sleeve 1 having a cylindrical bore throughout its length in which the cooperating clutch elements are mounted. A central disc 2 is non-rotatively mounted on the sleeve 1 and is separated from two rotative discs 3 by interposed discs or layers 4 of leather or other appropriate material. The discs 2 and 3 are embraced between a pair of end discs 5 non-rotatively mounted on the sleeve 1 and spaced from the adjacent discs 3 by interposed layers or discs 6 of leather or other appropriate material. Preferably, the discs 3 are of slightly greater diameter than the discs 2 and 5, so as to support and retain therewith an enclosing band or shell 7. Due to the greater diameter of the discs 3, the band or shell 7 is retained out of contact with the discs 2 and 5, leaving the shell free to turn and move with said discs 3. Each of the discs 3 is provided with an integral or rigid arm 8 for pivotal connection with a bracket 9 attached to a part of the vehicle to which the shock absorber is to be applied. By pressing the discs 5 on the discs 3, resistance to the turning of the discs 3 relative to the discs 5 may be created. My invention comprises means for applying such pressure and for connecting the associated clutch member with another part of the vehicle so as to offer the proper resistance to the relative movements of the parts, thus preventing the rebound and vibration of the vehicle without interfering with the functioning of the springs.

The associated clutch member 10 is enclosed within the sleeve 1 and provided with a number of reentrant notches 11 containing the clutch cylinders or rolls 12 which extend parallel with the axis of the device. A leaf spring 13 is located in each of the notches 11 and is arranged to press the associated clutch roll outwardly toward clutching position. A preferred method of holding the springs 13 in proper position is shown in Fig. 5, in which it will be seen that the central portion of each spring is seated within a groove 14 in the member 10. The formation of the groove 14 leaves a lug 15 which engages a bent portion of the spring and thereby prevents any displacement of the spring. The discs 2, 3 and 5 are limited as to their axial movements on the member 1 by rings 16. One of said rings 16 is placed around the member 1 adjacent to each end thereof and is engaged in notches formed in the corners of said member 1.

The ends of the member 10 are extended beyond the ends of the member 1 and are preferably polygonal in cross section.

An anti-friction device is located at the outer side of each of the discs 5. The anti-friction devices can be of any appropriate type. As shown, each anti-friction device includes a washer 17 bearing against the outer side of the adjacent discs 5, an annular anti-friction member 18 and a washer 19 at the outer side of the anti-friction member. The parts of each anti-friction device are supported upon an annular flange 20 formed integral with a cap 21 having a circumferential flange 22 encircling the adjacent non-rotative end disc 5.

An arm or lever 23 is connected to each end of the clutch member 10 by providing said arms or levers with polygonal holes to receive the polygonal end portions of said member 10. The arms or levers 23 correspond to the arms 8 which are formed in connection with the rotative discs 3, as previously described, and are for the purpose of connecting with a proper part of the vehicle to prevent rebound and vibration of the vehicle when travelling over rough or uneven surfaces without interfering with the functioning of the springs.

A plate 24, having a dished inner surface to receive one end of the clutch member 10, is mounted against the outer side of one of the arms or levers 23. Said plate is formed with a central hole through which a bolt 25 extends, said bolt passing axially through the clutch member 10 and beyond the opposite end thereof. A plate 26, having its inner surface dished to receive the extended end of the clutch member 10, bears against the other arm or lever 23. A spring housing 27, open at its outer end and provided with a circumferential flange 28 at said open end, extends through a central hole in the plate 26 and into the clutch member 10 and terminates some distance inwardly from the plate 24. The inner end of the housing 27 is provided with an end wall 29 having a central hole through which the bolt 25 extends. A coiled spring 30 of the expansion type is within the housing 27 having its inner end bearing against the end wall 29 of the housing and its opposite end bearing against a washer 31 on the bolt 25. A nut 32 is adjustable on the threaded end of the bolt against the washer 31 to vary the tension of the spring 30 as desired.

From the foregoing it will be seen that by proper adjustment of the nut 32 on the bolt 25, the tension and power of the spring 30 may be widely varied. By increasing the tension and power of the spring the plate 26 is pressed inwardly to increase the pressure at one side of the discs and the plate 24 is pressed inwardly to increase the pressure at the opposite side of the discs. Thus, the resistance to the turning of the discs 3, relative to the discs 2 and 5, may be widely varied so as to adapt the device to function properly under various conditions of load and road surface. The polygonal head of the bolt 25 is accessible at the side of the plate 24, while the nut 32 is received within the open end of the spring housing 27 which protects the nut from accidental displacement, and also protects the end of the bolt from injury.

From the foregoing it is clear that my invention obtains all of its intended results in a highly efficient manner. The ease of adjusting the device for use under various conditions is an important feature of the invention. The parts do not wear rapidly and such wear as may occur is easily counteracted by simply increasing the power and tension of the compression spring.

I do not restrict myself to unessential features of limitations, but what I claim and desire to secure by Letters Patent is:—

1. A shock absorber of the character described, comprising an outer polygonal clutch member having a cylindrical opening therethrough, a lever pivoted for turning movements on the outer clutch member, devices obtaining frictional engagement between said lever and said outer clutch member, an inner clutch member within the cylindrical opening in the outer clutch member arranged to turn freely in one direction, a number of clutch elements between the inner and outer clutch members preventing free turning of the inner clutch member in the opposite direction, a lever having sliding and relatively non-rotative connection with the inner clutch member, and means for connecting the ends of said levers to relatively movable parts of a vehicle.

2. A shock absorber of the character described, comprising an outer polygonal clutch member having a cylindrical opening therethrough, a lever pivoted for turning movements on the outer clutch member, discs having non-rotative sliding engagement with the polygonal clutch member, friction elements between said discs and said lever, an inner clutch member within the cylindrical opening in the outer clutch member arranged to turn freely in one direction, a number of clutch elements between the inner and outer clutch members preventing free turning of the inner clutch member in the opposite direction, a lever having non-rotative sliding connection with the inner clutch member, and means for connecting the ends of said levers to relatively movable parts of a vehicle.

3. A shock absorber of the character described, comprising an outer clutch member having a cylindrical opening therethrough, a lever having one end pivoted on the outer clutch member, an inner clutch member within the cylindrical opening in the outer clutch member arranged to turn freely in one direction, a number of clutch elements between the inner and outer clutch members preventing free turning of the inner clutch member in the opposite direction, a lever having non-rotative sliding connection with the inner clutch member, frictional elements having non-rotative sliding connection with the outer clutch member for retarding free turning movements of the first-named lever on said outer clutch member, and means for varying the power of said frictional elements to retard free turning movements of the first-named lever.

4. A shock absorber of the character described, comprising an outer clutch member, a disc non-rotative on said clutch member, a lever pivoted on said clutch member at each side of said disc, a number of additional discs non-rotative on the outer clutch member, means for imparting pressure to said additional discs to retard turning movements of said levers relative to said clutch member, clutch mechanism within the outer clutch member permitting free turning movements of the outer clutch member in one direction and preventing free turning movement of the outer clutch member in the other direction, and levers held in non-rotative engagement with said clutch mechanism by said pressure means.

5. A shock absorber of the character described, comprising a polygonal outer clutch member having a cylindrical opening therethrough, a disc non-rotative on said clutch member, a lever pivoted on said clutch member at each side of said disc, an additional non-rotative disc slidable on the outer clutch member at the outer side of each of said levers, an inner clutch member within the cylindrical opening in the outer clutch member having polygonal ends extending beyond the ends of the outer clutch member and arranged to turn freely in one direction, a number of clutch elements between the inner and outer clutch members preventing free turning of the inner clutch member in the opposite direction, a lever having sliding non-rotative engagement with the polygonal ends of said inner clutch member beyond the ends of the outer clutch member, thrust bearings between the ends of said second levers and the discs at the outer sides of the first-named levers, and means for imparting pressure to said second-named levers to cause said thrust bearings to impart pressure against said first-named levers.

6. A shock absorber of the character described, comprising a polygonal outer clutch member having a cylindrical opening therethrough, a disc non-rotative on said clutch member, a lever pivoted on said clutch member at each side of said disc, an additional non-rotative disc slidable on the outer clutch member at the outer side of each of said levers, an inner clutch member within the cylindrical opening in the outer clutch member having polygonal ends extending beyond the ends of the outer clutch member and arranged to turn freely in one direction, a number of clutch elements between the inner and outer clutch members preventing free turning of the inner clutch member in the opposite direction, a lever having sliding non-rotative engagement with the polygonal ends of said inner clutch member beyond the ends of the outer clutch member, thrust bearings between the ends of said second levers and the discs at the outer sides of the first-named levers, means for imparting pressure to said second-named levers to cause said thrust bearings to impart pressure against said first-named levers, and a device for varying the degree of pressure imparted as aforesaid.

7. A shock absorber of the character described, comprising a polygonal outer clutch member having a cylindrical opening therethrough, a disc non-rotative on said clutch member, a lever pivoted on said clutch member at each side of said disc, an additional non-rotative disc slidable on the outer clutch member at the outer side of each of said levers, an inner clutch member within the cylindrical opening in the outer clutch member having polygonal ends extending beyond the ends of the outer clutch member and arranged to turn freely in one direction, a number of clutch elements between the inner and outer clutch members preventing free turning of the inner clutch member in the opposite direction, a lever having sliding non-rotative engagement with the polygonal ends of said inner clutch member beyond the ends of the outer clutch member, thrust bearings between the ends of said second levers and the discs at the outer sides of the first-named levers, means for imparting pressure to said second-named levers to cause said thrust bearings to impart pressure against said first-named levers, and means for varying the power of said frictional element to retard free turning movements of the first-named lever.

CHARLES T. BROWN.